(12) United States Patent
Peterson et al.

(10) Patent No.: US 10,674,084 B1
(45) Date of Patent: Jun. 2, 2020

(54) SELECTING CAMERAS WITH DIFFERENT ORIENTATIONS

(71) Applicant: LENOVO (Singapore) PTE. LTD., New Tech Park (SG)

(72) Inventors: Nathan J. Peterson, Oxford, NC (US); Mark Patrick Delaney, Raleigh, NC (US); John Carl Mese, Cary, NC (US); Russell Speight VanBlon, Raleigh, NC (US); Arnold S. Weksler, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/365,297

(22) Filed: Mar. 26, 2019

(51) Int. Cl.
*H04N 5/232* (2006.01)
*G06T 7/70* (2017.01)
*G06K 9/00* (2006.01)

(52) U.S. Cl.
CPC ..... *H04N 5/23245* (2013.01); *G06K 9/00697* (2013.01); *G06T 7/70* (2017.01); *H04N 5/23229* (2013.01); *H04N 5/23238* (2013.01)

(58) Field of Classification Search
CPC .. G06T 7/70; H04N 5/23229; H04N 5/23238; G06K 9/00697
See application file for complete search history.

(56) References Cited

U.S. PATENT DOCUMENTS

| | | | |
|---|---|---|---|
| 2015/0002688 A1* | 1/2015 | Baldwin | H04N 5/23203 348/211.9 |
| 2015/0350505 A1* | 12/2015 | Malkin | H04N 5/2257 348/357 |
| 2019/0083885 A1* | 3/2019 | Yee | A63F 13/52 |

* cited by examiner

*Primary Examiner* — Shahbaz Nazrul
(74) *Attorney, Agent, or Firm* — Kunzler Bean & Adamson

(57) ABSTRACT

For selecting cameras with different orientations, a processor determines a desired scene orientation. The processor further determines a device orientation. The processor selects one of the portrait camera and the landscape camera in response to the desired scene orientation and the device orientation.

15 Claims, 8 Drawing Sheets

SELECTING CAMERAS WITH DIFFERENT ORIENTATIONS

FIELD

The subject matter disclosed herein relates to selecting cameras and more particularly relates to selecting cameras with different orientations.

BACKGROUND

Users often want different image orientations when capturing an image.

BRIEF SUMMARY

An apparatus for selecting cameras with different orientations is disclosed. The apparatus includes a portrait camera, a landscape camera, a processor, and a memory. The memory stores code executable by the processor. The processor determines a desired scene orientation. The processor further determines a device orientation. The processor selects one of the portrait camera and the landscape camera in response to the desired scene orientation and the device orientation. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
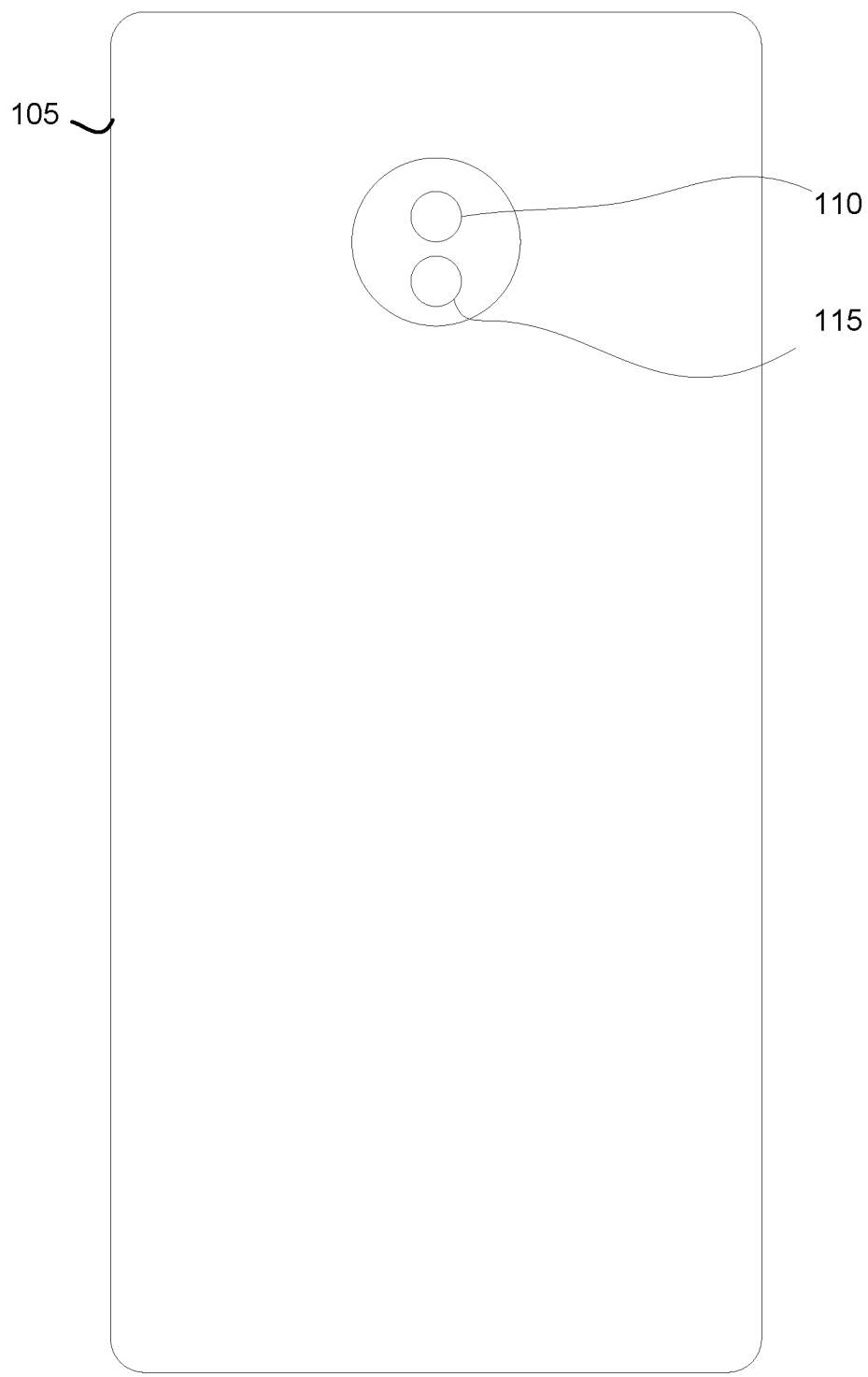
FIG. 1A is a back view drawing illustrating one embodiment of an electronic device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a back view drawing illustrating one embodiment of an electronic device 105. In the depicted embodiment, the electronic device 105 is a mobile telephone. Other electronic devices 105 may be employed as are described hereafter. The electronic device 105 includes a portrait camera 110 and a landscape camera 115. The portrait camera 110 captures an image with a portrait orientation. As used herein, a portrait orientation has a vertical dimension of the image that is longer than the horizontal dimension. The landscape camera 115 captures an image with a landscape orientation. As used herein, a landscape orientation has a vertical dimension of the image that is shorter than the horizontal dimension.

A user of the electronic device 105 may have a preference as to whether an image is captured with the horizontal orientation or a vertical orientation. The preference may further differ depending on the scene composition. Unfortunately, the user may also have a preference for holding the electronic device 105 that differs from the preference for the image orientation. For example, a user may prefer to capture an image with the landscape orientation, but also prefer to hold the electronic device 105 so that the electronic device 105 captures the image with a landscape orientation. The embodiments described herein select one of the portrait camera 110 and the landscape camera 115 in response to a desired scene orientation and a device orientation of the electronic device 105. As a result, the embodiments capture the image with the desired scene orientation regardless of how the user is holding the electronic device 105, improving the function of the electronic device 105 for the user.

Figure 1B:
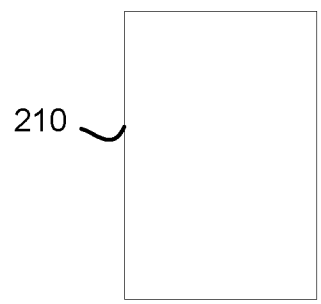
FIG. 1B is a schematic block diagram illustrating one embodiment of light sensing devices.
Figure 1B:
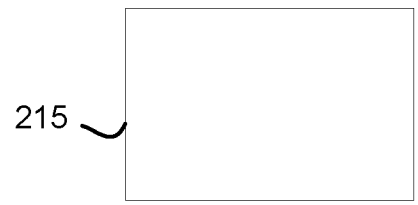

FIG. 1B is a schematic block diagram illustrating one embodiment of light sensing devices 210/215. The light sensing devices 210/215 may be charge-coupled device (CCD) sensors, complementary metal oxide semiconductor (CMOS) sensors, and the like. A portrait light sensing device 210 may be used in the portrait camera 110. A landscape light sensing device 215 may be used in the landscape camera 115. In one embodiment, the portrait light sensing device 210 and the landscape light sensing device 215 may only differ in orientation.

Figure 1C:
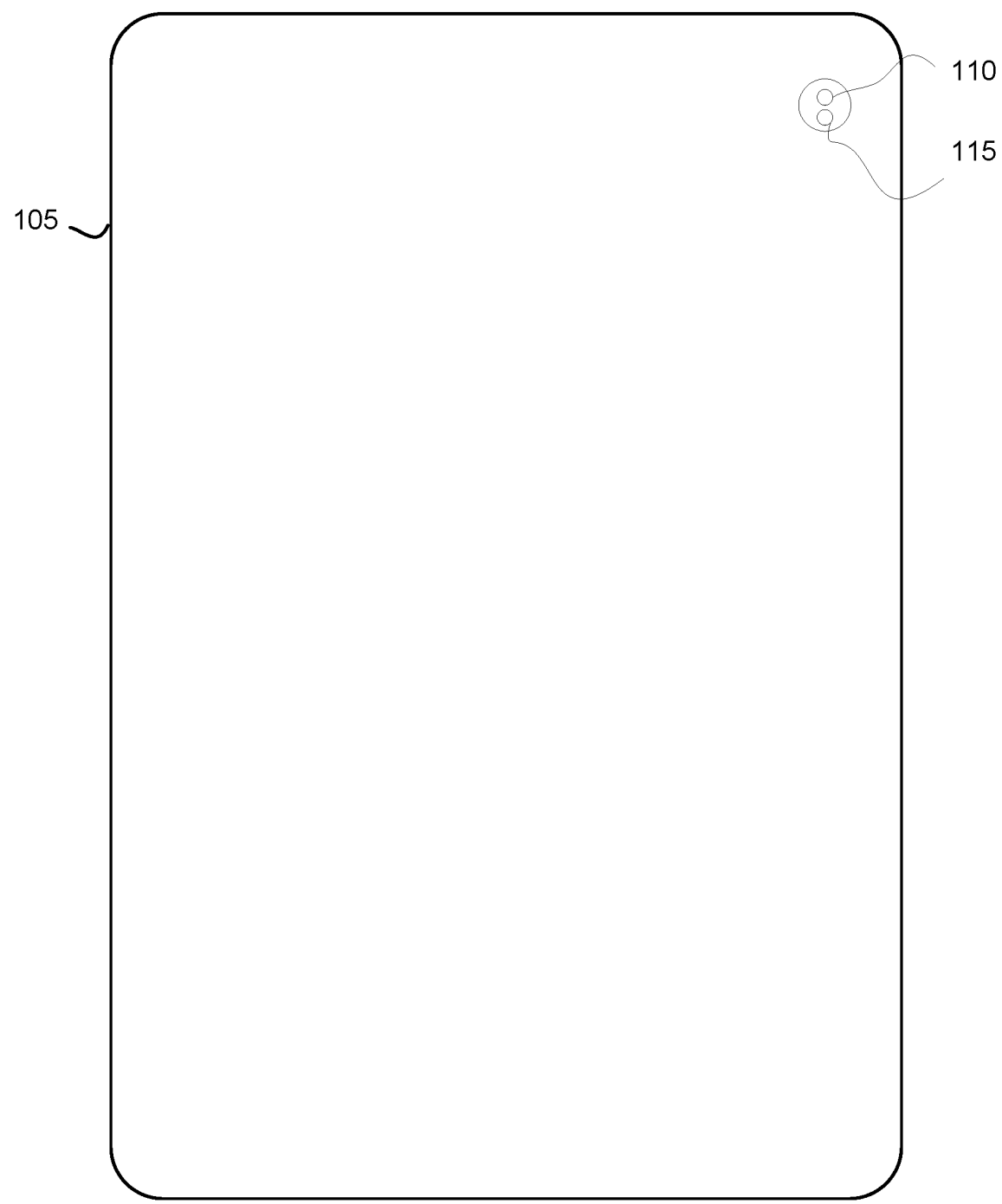
FIG. 1C is a back view drawing illustrating one alternate embodiment of an electronic device.

FIG. 1C is a back view drawing illustrating one alternate embodiment of an electronic device 105. In the depicted embodiment, a tablet computer electronic device 105 is shown with the portrait camera 110 and the landscape camera 115.

Figure 1D:
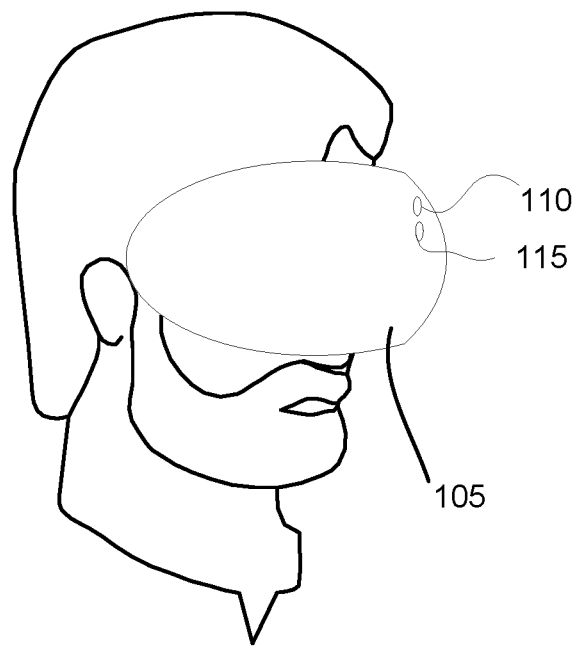
FIG. 1D is a perspective drawing illustrating one alternate embodiment of an electronic device.

FIG. 1D is a perspective drawing illustrating one alternate embodiment of an electronic device 105. The depicted electronic device 105 may be of virtual reality electronic device 105 and/or an augmented reality electronic device 105. The electronic device 105 includes the portrait camera 110 and the landscape camera 115.

Figure 2:
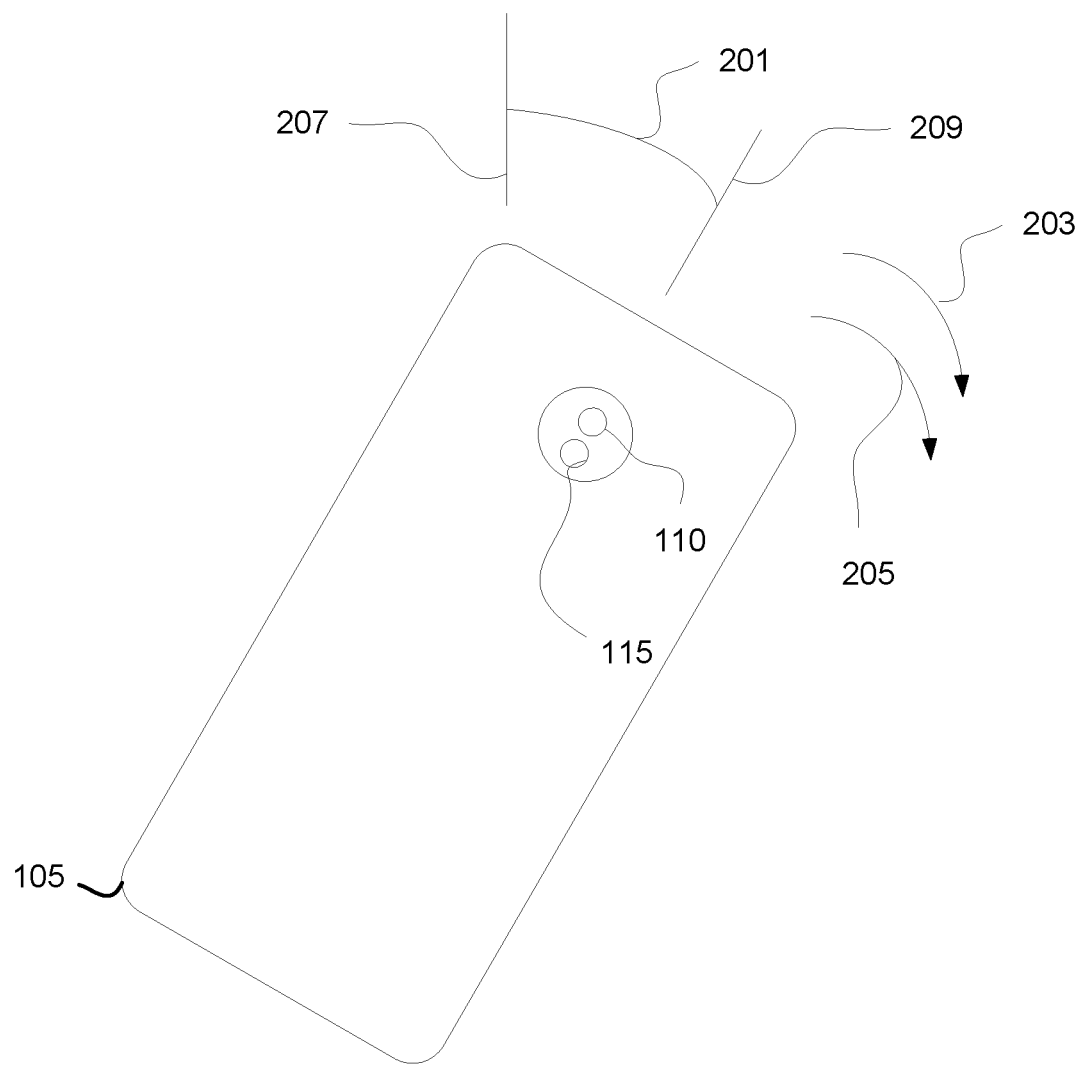
FIG. 2 is a back view drawing illustrating one embodiment of electronic device motion.

FIG. 2 is a back view drawing illustrating one embodiment of electronic device motion. A longitudinal axis 209 is shown for the electronic device 105. A device orientation of the electronic device 105 may include a device angle 201 between the longitudinal axis 209 and a vertical axis 207. In one embodiment, a plane of the electronic device 105 is approximately parallel to a vertical plane. As used herein, approximately parallel is within 30 degrees of the vertical plane. In a certain embodiment, only angles of the longitudinal axis 209 in the vertical plane are included in the device angle 201. In one embodiment, the portrait camera 110 captures an image with a portrait orientation and the landscape camera 115 captures an image with the landscape orientation if the device angle is approximate 0 degrees. Approximately 0 degrees may be with 25 degrees of the vertical axis 207.

The device angle 201 may change with a device angular velocity 203. In addition, the device angular velocity 203 may change with the device angular acceleration 205.

Figure 3:
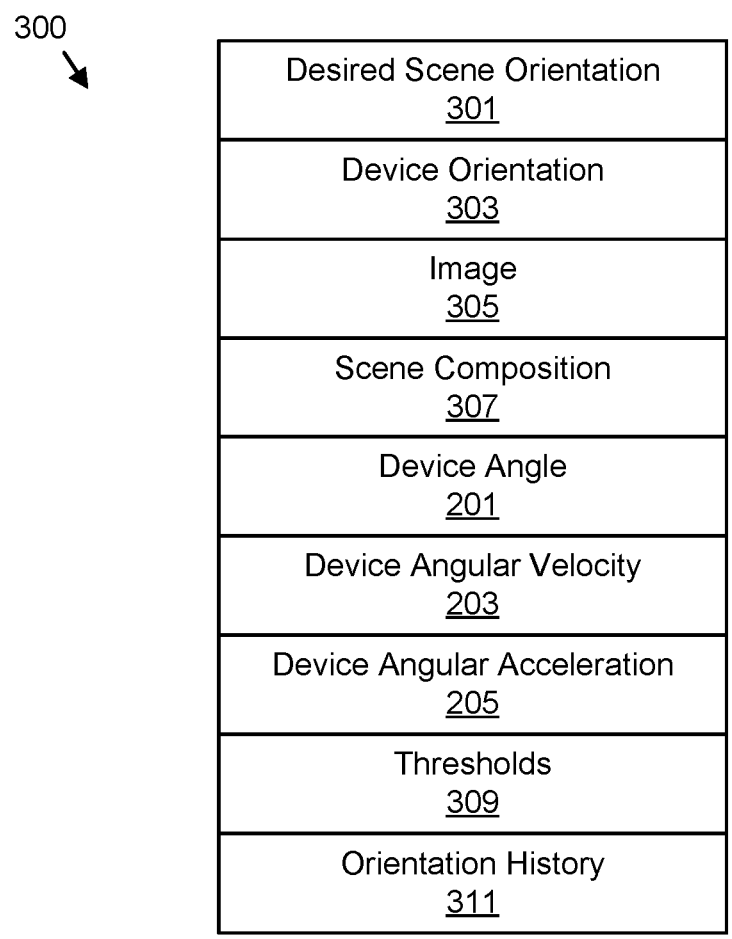
FIG. 3 is a schematic block diagram illustrating one embodiment of camera data.

FIG. 3 is a schematic block diagram illustrating one embodiment of camera data 300. The camera data 300 may be organized as a data structure in a memory. In the depicted embodiment, the camera data 300 includes the desired scene orientation 301, the device orientation 303, the image 305, a scene composition 307, the device angle 201, the device angular velocity 203, the device angular acceleration 205, one or more thresholds 309, and an orientation history 311.

The desired scene orientation 301 may specify whether the user desires a portrait orientation or landscape orientation for the image 305. The desired scene orientation 301 may be user defined.

In one embodiment, the desired scene orientation 301 is calculated from the orientation history 311. The orientation history 311 may record the image orientation of each image 305 captured by the electronic device 105. A mean image orientation may be selected as the desired scene orientation 301.

In addition, the orientation history 311 may record a corresponding scene composition 307 for each image 305. In one embodiment, the scene composition 307 may be determined and the mean image orientation for the corresponding scene compositions 307 in the orientation history 311 may be selected as the desired scene orientation 301.

In one embodiment, the desired scene orientation 301 includes an image orientation for each scene composition 307. The desired scene orientation 301 may be based on the scene composition 307. For example, the desired scene orientation 301 for a large group of subjects may be the landscape orientation, while the desired scene orientation 301 for a small group of subjects may be the portrait orientation.

The device orientation 303 may be determined from the device angle 201. In addition, the device orientation 303 may be determined from the device angular velocity 203 and/or the device angular acceleration 205. In a certain embodiment, only the device angle 201 in a vertical plane is considered for the device orientation 303.

The image 305 may be a still image. In one embodiment, the image 305 is a defined plurality of still images. For example, five still images may be captured for the image 305. In addition, the image 305 may be a video image comprising a continuous plurality of still images.

The image 305 may be captured in one of the portrait orientation and the landscape orientation. Alternatively, the image 305 may be concurrently captured in both the portrait orientation and the landscape orientation. In a certain embodiment, the portrait camera 110 and the landscape camera 115 both concurrently capture the image 305 in the portrait orientation and landscape orientation respectively in response to the device angle 201 being within an angle band of the thresholds. The angle band may be between a first angle and the second angle from the vertical axis 207. The first angle may be in the range of 20 to 40 degrees. The second angle may be in the range of 50 to 70 degrees.

Figure 4:
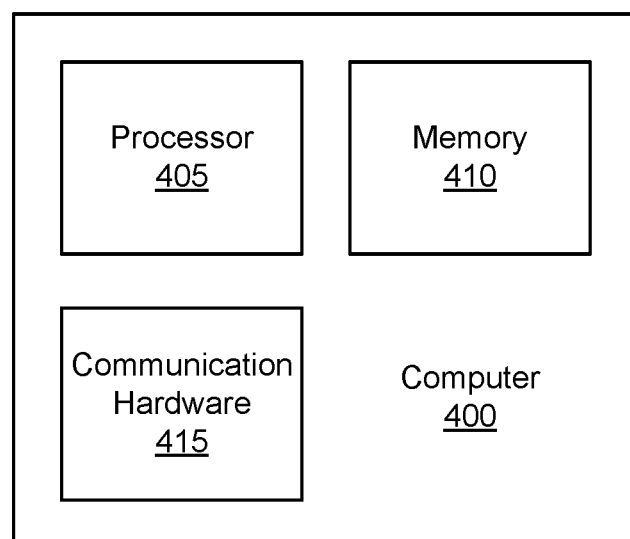
FIG. 4 is a schematic block diagram illustrating one embodiment of a computer.

FIG. 4 is a schematic block diagram illustrating one embodiment of a computer 400. The computer 400 may be embodied in the electronic device 105. In addition, the computer 400 may be in communication with the electronic device 105. In the depicted embodiment, the computer 400 includes a memory 410, a processor 405, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the portrait camera 110 and the landscape camera 115.

Figure 5:
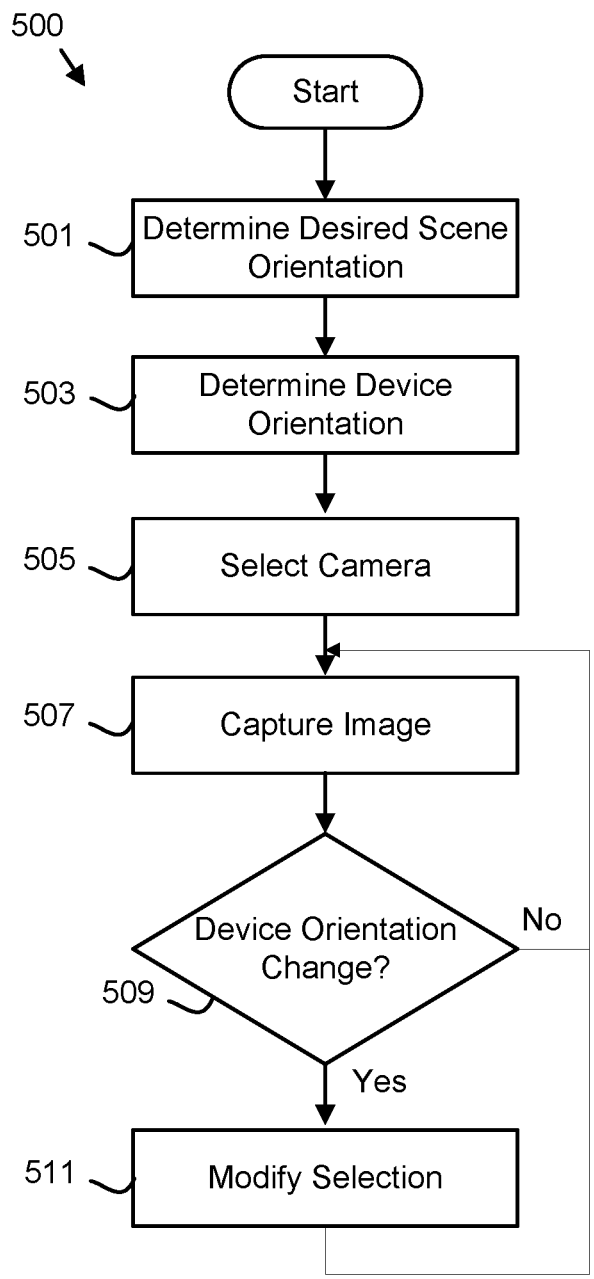
FIG. 5 is a schematic flow chart diagram illustrating one embodiment of a camera selection method.

FIG. 5 is a schematic flow chart diagram illustrating one embodiment of a camera selection method 500. The method 500 may select the portrait camera 110, the landscape camera 115, or combinations thereof and capture the image 305. The method 500 may be performed by the electronic device 105, the computer 400, and/or the processor 405 of the computer 400.

The method 500 starts, and in one embodiment, the processor 405 determines 501 the desired scene orientation 301. The desired scene orientation 301 may be user-defined. In addition, the desired scene orientation 301 may be based on the orientation history 311. In one embodiment, the desired scene orientation 301 is determined from a weighted average of image orientations wherein more recent image orientations are weighted more heavily.

In one embodiment, the desired scene orientation 301 is based on the scene composition 307. For example, one of the cameras 110/115 may capture a preliminary image of the scene and the processor 405 may identify each face of a subject in the scene. The desired scene orientation 301 may be selected to approximate the distribution of faces in the scene.

In one embodiment, the processor 405 may identify one or more composition diagonals in the scene and select the image orientation as the desired scene orientation 301 that makes best use of the composition diagonals. For example, the processor 405 may determine 501 the landscape orientation is the desired scene orientation 301 in response to a diagonal of the scene generating a desired proportion.

The processor 405 may further determine 503 the device orientation 303. The electronic device 105 may be determined 503 to be vertical if the device angle 201 is less than the first angle. In addition, the electronic device 105 may be horizontal if the device angle 201 is greater than the second angle.

The processor 405 may select 505 one of the portrait camera 110 and the landscape camera 115 in response to the desired scene orientation 301 and the device orientation 303. In one embodiment, one of the portrait camera 110 or the landscape camera 115 is selected as shown in Table 1.

TABLE 1

|  | Device orientation 303 | |
| --- | --- | --- |
|  | Vertical | Horizontal |
| Desired scene orientation 301 |  |  |
| Portrait orientation | Portrait camera 110 | Landscape camera 115 |
| Landscape orientation | Landscape camera 115 | Portrait camera 110 |

In one embodiment, the processor 405 selects 505 both the portrait camera 110 and the landscape camera 115. Both the portrait camera 110 and the landscape camera 115 may be selected 505 in response to the device angle 201 being with in the angle band. In a certain embodiment, both the portrait camera 110 and the landscape camera 115 are always selected. The user may subsequently select between an portrait image 305 and a landscape image 305.

The processor 405 may capture 507 the image 305. The image 305 may be captured 507 with the selected camera 110/115 of the portrait camera 110 and/or the landscape camera 115.

The processor 405 may detect 509 the change in the device orientation 303. The processor 405 may only detect 509 the change in the device orientation 303 if the electronic device 105 is capturing a video image 305.

In one embodiment, the changes detected from a change in the device angle 201. In addition, the change in the device orientation 303 may be detected 509 from a device angular velocity 203. The change in device orientation 303 may further be detected 509 from the device angular acceleration 205. In one embodiment, the change in device orientation 303 comprises a change in the device angle 201 of greater than an angle threshold of the thresholds 309 along with the device angular velocity 203 that is greater than a velocity threshold of the thresholds 309 and a device angular acceleration 205 that is less than the acceleration threshold of the thresholds 309.

If no change in the device orientation 303 is detected 509, the selected camera 110/115 may continue to capture 507 the image 305. If the change in the device orientation 303 is detected 509, the processor 405 may modify 511 the selection of one of the portrait camera 110 and the landscape camera 115. The selected camera 110/115 may be modified 511 in response to the desired scene orientation 301 and the change device orientation 303.

The selected camera 110/115 may be modified based on one or more of the device angle 201, the device angular velocity 203, and the device angular acceleration 205. In one embodiment, the selected camera 110/115 is modified 511 in response to a change in the device angle 201 exceeding 40 degrees and the device angular acceleration 205 remaining within an acceleration band of the thresholds 309. In a certain embodiment, the selected camera 110/115 is modified 511 if the device angle 201 changes by more than 45 degrees.

The embodiments select one of the portrait camera 110 and the landscape camera 115 in response to the desired scene orientation 301 and the device orientation 303. As a result, the orientation of the image 305 will automatically be the orientation desired by the user. Thus, the functioning of the computer 400 and/or electronic device 105 is improved by capturing images 305 with the desired scene orientation 301.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a portrait camera;
   a landscape camera;
   a processor;
   a memory that stores code executable by the processor to:
   determine a desired scene orientation;
   determine a device orientation;
   select one of the portrait camera and the landscape camera in response to the desired scene orientation and the device orientation; and
   modify the selected camera in response to a change in the device angle of grater than an angle threshold of 40 degrees along with a device angular velocity that is greater than a velocity threshold and a device angular acceleration that is less than an acceleration threshold.

2. The apparatus of claim 1, wherein the code is further executable by the processor to capture an image using the selected camera.

3. The apparatus of claim 1, wherein the code is further executable by the processor to:
   detect the change in the device orientation.

4. The apparatus of claim 1, wherein the desired scene orientation is user defined.

5. The apparatus of claim 1, wherein the desired scene orientation is based on a scene composition.

6. A method comprising:
   determining, by use of a processor, a desired scene orientation;
   determining a device orientation;
   selecting one of a portrait camera and a landscape camera in response to the desired scene orientation and the device orientation; and
   modifying the selected camera in response to a change in the device angle of greater than an angle threshold of 40 degrees along with a device angular velocity that is greater than a velocity threshold and a device angular acceleration that is less than an acceleration threshold.

7. The method of claim 6, the method further comprising capturing an image using the selected camera.

8. The method of claim 6, the method further comprising:
   detecting the change in the device orientation.

9. The method of claim 6, wherein the portrait camera and the landscape camera both capture an image in response to the device angle being within an angle band.

10. The method of claim 6, wherein the desired scene orientation is user defined.

11. The method of claim 6, wherein the desired scene orientation is based on a scene composition.

12. The apparatus of claim 1, wherein the portrait camera and the landscape camera both capture an image in response to the device angle being within an angle band.

13. A program product comprising a non-transitory computer readable storage medium that stores code executable by a processor, the executable code comprising code to:
   determine a desired scene orientation;
   determine a device orientation;
   select one of a portrait camera and the landscape camera in response to the desired scene orientation and the device orientation; and
   modify the selected camera in response to a change in the device angle of grater than an angle threshold of 40 degrees along with a device angular velocity that is greater than a velocity threshold and a device angular acceleration that is less than an acceleration threshold.

14. The program product of claim 13, wherein the code is further executable by the processor to capture an image using the selected camera.

15. The program product of claim 13, wherein the code is further executable by the processor to:
   detect a change in the device orientation.

* * * * *